(12) United States Patent
Kerns

(10) Patent No.: US 8,311,708 B2
(45) Date of Patent: Nov. 13, 2012

(54) ADJUSTABLE GRILL SHUTTER SYSTEM

(75) Inventor: James Michael Kerns, Trenton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 100 days.

(21) Appl. No.: 12/706,395

(22) Filed: Feb. 16, 2010

(65) Prior Publication Data
US 2011/0137530 A1 Jun. 9, 2011

(51) Int. Cl.
*G06F 17/00* (2006.01)
*G06F 7/00* (2006.01)

(52) U.S. Cl. .............. 701/49; 701/36; 701/101
(58) Field of Classification Search ............ 701/36, 701/49, 101; 180/68.1, 68.2
See application file for complete search history.

(56) References Cited

U.S. PATENT DOCUMENTS

| | | | | |
|---|---|---|---|---|
| 4,133,185 A * | 1/1979 | Dickey | ............. | 62/179 |
| 4,779,577 A | 10/1988 | Ritter et al. | | |
| 5,036,803 A * | 8/1991 | Nolting et al. | ............. | 123/41.1 |
| 6,588,380 B2 * | 7/2003 | Ries-Mueller | ............. | 123/41.05 |
| 7,424,868 B2 * | 9/2008 | Reckels et al. | ............. | 123/41.1 |
| 7,766,111 B2 * | 8/2010 | Guilfoyle et al. | ............. | 180/68.1 |
| 7,784,576 B2 * | 8/2010 | Guilfoyle et al. | ............. | 180/68.1 |
| 2006/0095178 A1 * | 5/2006 | Guilfoyle et al. | ............. | 701/36 |
| 2006/0102399 A1 * | 5/2006 | Guilfoyle et al. | ............. | 180/68.1 |
| 2007/0261648 A1 * | 11/2007 | Reckels et al. | ............. | 123/41.12 |
| 2007/0272173 A1 * | 11/2007 | Reckels et al. | ............. | 123/41.11 |
| 2008/0185128 A1 * | 8/2008 | Moon et al. | ............. | 165/104.26 |
| 2008/0283215 A1 * | 11/2008 | Saida et al. | ............. | 165/43 |
| 2009/0050385 A1 * | 2/2009 | Guilfoyle et al. | ............. | 180/68.1 |

* cited by examiner

*Primary Examiner* — Khoi Tran
*Assistant Examiner* — Jorge Peche
(74) *Attorney, Agent, or Firm* — Julia Voutyras; Alleman Hall McCoy Russell & Tuttle LLP

(57) ABSTRACT

An adjustable grill shutter system is provided. In one embodiment, adjustment of the grill shutter system can be provided by a method of adjusting a grill shutter system for a vehicle, the method comprising adjusting opening of one or more grill shutters located at a front end opening of the vehicle in response to a non-driven vehicle condition.

11 Claims, 6 Drawing Sheets

ADJUSTABLE GRILL SHUTTER SYSTEM

BACKGROUND AND SUMMARY

A vehicle grill is typically located at a front of a vehicle, and can be configured to provide an opening through with intake air is received from outside of the vehicle, such as a grill opening or bumper opening. Such intake air may then be directed to an engine compartment of the vehicle to assist the vehicle's cooling system in cooling the engine, transmission, and other such components of the engine compartment. Such air flow via the grill may add aerodynamic drag when the vehicle is in motion. Accordingly, some grills may employ grill shutters to block such air flow, thus reducing aerodynamic drag and improving fuel economy. Closed grill shutters may also provide a faster powertrain warm-up which may improve fuel economy since there is less friction, and may improve the performance of the passenger compartment heater. However, such shutters also reduce the air flow through the radiator and other components for cooling purposes. Thus, traditional operation of such shutters includes opening the shutters partially and/or cycling the shutters open and closed to provide appropriate air flow based on cooling demands.

One example of operating vehicle shutters includes operating the shutters based on a temperature of the engine or a temperature of the coolant, so as to provide appropriate air flow for cooling purposes. As an example, a temperature sensor may detect the cooling water temperature of the engine, and calculate a time-dependent progression of the temperature change, and based on this, determine the opening angle to be set for the shutters. The inventor of the present application has recognized a problem in such previous solutions, in that such shutter operation may increase aerodynamic drag, and thus be at the expense of fuel economy.

In one example, some of the above issues may be addressed by operating the shutters not only based on cooling system demands, but also considering conditions where an increase in aerodynamic drag does not cause any fuel economy loss, such as during deceleration. Thus, a method of adjusting a grill shutter system for a vehicle is disclosed herein, which comprises adjusting opening of one or more grill shutters located at a front end opening of the vehicle in response to a non-driven vehicle condition. A non-driven vehicle condition includes when the vehicle is not being driven by the engine/powertrain, such as during a deceleration condition, a braking condition (during deceleration or acceleration), etc. In this way, a driver may already be "throwing away" energy, for example to the brakes, and thus opening the shutters in response to a non-driven vehicle condition can provide cooling that is not at the expense of fuel economy. Further, by pre-cooling the powertrain components to lower temperatures during a non-driven vehicle condition, an amount of shutter opening (e.g., a degree of shutter opening and/or a duration of shutter opening) during later, driven vehicle conditions, can be reduced. For example, during later acceleration, opening of the shutters can be delayed. As another example, during later acceleration, even if the opening timing of the shutters is not delayed, the degree of opening may be reduced. Further, grill shutters may be opened during a non-driven vehicle condition when cooling is desired, to avoid reducing the benefits of closed grill shutters described above (faster powertrain warm-up, improved performance of the passenger compartment heater, etc.).

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
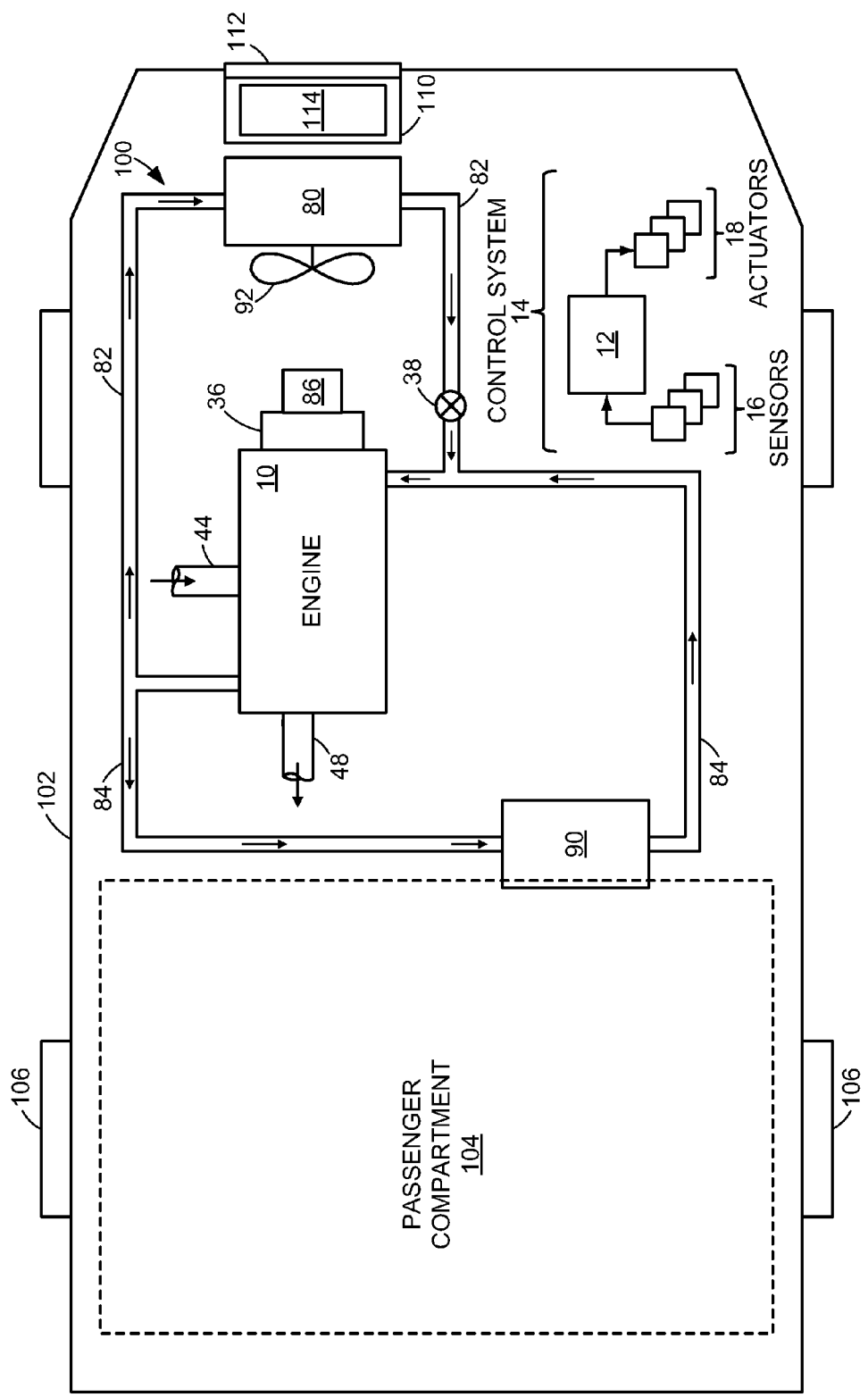
FIG. 1 schematically shows an example embodiment of grill shutter system in a motor vehicle.

Turning now to FIG. 1, an example embodiment of grill shutter system 110 in a motor vehicle 102 is illustrated schematically. Vehicle 102 has drive wheels 106, a passenger compartment 104, and an engine compartment including an internal combustion engine 10. Internal combustion engine 10 has a combustion chamber which may receive intake air via intake passage 44 and may exhaust combustion gases via exhaust passage 48. Engine 10 as illustrated and described herein may be included in a vehicle such as a road automobile, among other types of vehicles. While the example applications of engine 10 will be described with reference to a vehicle, it should be appreciated that various types of engines and vehicle propulsion systems may be used, including passenger cars, trucks, etc.

Motor vehicle 102 further includes a cooling system 100 that circulates coolant through internal combustion engine 10 to absorb waste heat and distributes the heated coolant to radiator 80 and/or heater core 90 via coolant lines 82 and 84, respectively. In particular, FIG. 1 shows cooling system 100 coupled to engine 10 and circulating engine coolant from engine 10 to radiator 80 via engine-driven water pump 86, and back to engine 10 via coolant line 82. Engine-driven water pump 86 may be coupled to the engine via front end accessory drive (FEAD) 36, and rotated proportionally to engine speed via belt, chain, etc. Specifically, engine-driven pump 86 circulates coolant through passages in the engine block, head, etc., to absorb engine heat, which is then transferred via the radiator 80 to ambient air. In an example where pump 86 is a centrifugal pump, the pressure (and resulting flow) produced may be proportional to the crankshaft speed, which in the example of FIG. 1, is directly proportional to engine speed. The temperature of the coolant may be regulated by a thermostat valve 38, located in the cooling line 82, which may be kept closed until the coolant reaches a threshold temperature.

Further, a fan 92 may be coupled to radiator 80 in order to maintain an airflow through radiator 80 when vehicle 102 is moving slowly or stopped while the engine is running. In some examples, fan speed may be controlled by a controller 12 described in more detail hereafter. Alternatively, fan 92 may be coupled to engine-driven water pump 86.

Coolant may flow through coolant line 82, as described above, and/or through coolant line 84 to heater core 90 where the heat may be transferred to passenger compartment 104, and the coolant flows back to engine 10. In some examples, engine-driven pump 86 may operate to circulate the coolant through both coolant lines 82 and 84.

FIG. 1 further shows a control system 14. Control system 14 may be communicatively coupled to various components of engine 10 to carry out the control routines and actions described herein. For example, as shown in FIG. 1, control system 14 may include an electronic digital controller 12. Controller 12 may be a microcomputer, including a microprocessor unit, input/output ports, an electronic storage medium for executable programs and calibration values, random access memory, keep alive memory, and a data bus. As depicted, controller 12 may receive input from a plurality of sensors 16, which may include user inputs and/or sensors (such as transmission gear position, gas pedal input, brake input, transmission selector position, vehicle speed, engine speed, mass airflow through the engine, ambient temperature, intake air temperature, etc.), cooling system sensors (such as coolant temperature, fan speed, passenger compartment temperature, ambient humidity, etc.), and others. Further, controller 12 may communicate with various actuators 18, which may include engine actuators (such as fuel injectors, an electronically controlled intake air throttle plate, spark plugs, etc.), cooling system actuators (such as air handling vents and/or diverter valves in the passenger compartment climate control system, etc.), and others. In some examples, the storage medium may be programmed with computer readable data representing instructions executable by the processor for performing the methods described below as well as other variants that are anticipated but not specifically listed.

As noted herein, the amount of waste heat transferred to the coolant from the engine may vary with operating conditions, thereby affecting the amount of heat transferred to the airflows. For example, as engine output torque, or fuel flow, is reduced, the amount of waste heat generated may be proportionally reduced.

Motor vehicle 102 further includes a grill 112 providing an opening (e.g., a grill opening, a bumper opening, etc.) for receiving air flow through or near the front end of the vehicle and into the engine compartment. Such air flow may then be utilized by radiator 80 and other components to keep the engine and/or transmission cool. Further, the air flow may reject heat from the vehicle air conditioning and can improve performance of turbo charged/super charged engines that are equipped with intercoolers that reduce the temperature of the air that goes into the intake manifold/engine. Other under hood components (fuel system, batteries, etc.) may benefit from the cooling air flow as well. Thus, grill shutter system 110 may assist cooling system 100 in cooling internal combustion engine 10. Grill shutter system 110 comprises one or more grill shutters 114 configured to adjust the amount of air flow received through grill 112.

Grill shutters 114 are moveable between an opened position and a closed position, and may be maintained at either position or a plurality of intermediate positions thereof. In other words, opening of grill shutters 114 may be adjusted such that grill shutters 114 are opened partially, closed partially, or cycled between an opened position and a closed position to provide air flow for cooling engine compartment components at the least loss in fuel economy. This is because closing and/or partially closing grill shutters 114 reduces an amount of air flow received through grill 112, thus reducing the aerodynamic drag on the vehicle.

In some embodiments, control system 14 may be configured to adjust opening of grill shutters 114. Adjusting opening of grill shutters 114 may include opening one or more of the grill shutters, closing one or more of the grill shutters, partially opening one or more of the grill shutters, partially closing one or more of the grill shutters, adjusting opening and closing timing, etc. As an example, controller 12 may be communicably connected to grill shutter system 110, and may have instructions stored thereon to adjust opening of grill shutters 114.

Further, grill shutter system 110 may be adjusted during a non-driven vehicle condition. Thus, adjusting opening of one or more of the grill shutters 114 can be in response to a non-driven vehicle condition. The non-driven vehicle condition may be a deceleration condition, a braking condition, a tip-out condition, a combination thereof, or another type of condition signaling that a non-driven vehicle condition is occurring, or about to occur. For example, an automatic cruise control braking signal may also be used. Further still, global positioning signals may be used indicating a slower region ahead, a downgrade approaching, etc.

Further, in some embodiments, the amount of adjustment of grill shutters 114 may depend on the degree of the non-driven vehicle condition, such as a degree of deceleration. For example, during greater deceleration, a degree of opening of grill shutters 114 may be increased and/or a timing of opening the grill shutters 114 may be made earlier, allowing for greater air flow to assist in cooling the engine.

Moreover, in some embodiments, grill shutter system 110 may be adjusted based on engine temperature and a non-driven vehicle condition. For example, controller 12 may be configured to monitor engine temperature, for example by monitoring a coolant temperature and comparing it to threshold values. Additional methods of adjusting grill shutter system 110 are described in more detail with reference to FIGS. 2-3.

By adjusting grill shutter system 110 based on a non-driven vehicle condition, grill shutters 114 can provide a "brake assist." For example, when the vehicle is decelerating and the brakes are applied, an increase in aerodynamic drag will not cause any fuel economy loss since the driver is "throwing away" energy to the brakes anyhow. Thus, grill shutters 114 can be opened (or operated with increased opening than they otherwise would based on a cooling need) during a non-driven vehicle condition to pre-cool powertrain components. By pre-cooling the powertrain components to lower temperatures, subsequent opening of grill shutters 114 (e.g., during subsequent acceleration, cruise operation, etc.) can be delayed, and/or a degree of subsequent grill opening may be reduced. In other words, opening the shutters during a non-driven vehicle condition cools powertrain components to a lower temperature than these components would be otherwise cooled. Thus, it takes longer to heat up these components during a subsequent acceleration, cruise operation, etc. and thus, it takes longer for the components to reach a high temperature threshold value where the shutters typically open again to provide cooling. Examples of engine cooling due to shutter operation are described in more detail with reference to FIGS. 4-6.

Figure 2:
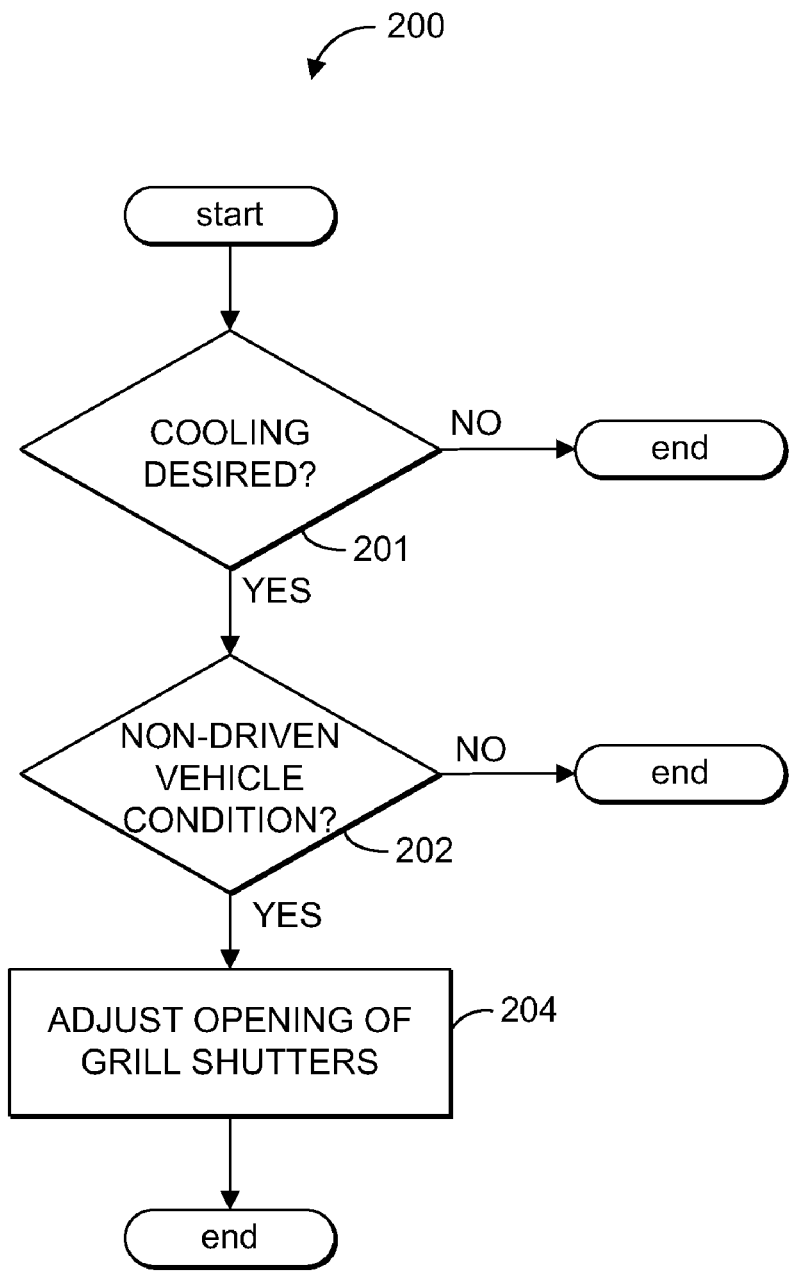
FIG. 2 shows a flow diagram of an example method of adjusting a grill shutter system in accordance with an embodiment of the present disclosure.

FIG. 2 shows an example method 200 of adjusting a grill shutter system based on a non-driven vehicle condition. At 201, method 200 includes determining if cooling is desired. For example, a coolant temperature may have exceeded a threshold value, an intake manifold temperature may have exceeded a threshold value, a modeled temperature (exhaust, engine oil, etc.) may have exceeded a threshold value, etc. If it is determined that cooling is not desired, then method 200 ends. However, if it is determined that cooling is desired, method 200 proceeds to 202. At 202, method 200 includes determining if there is a non-driven vehicle condition. Such a determination may include detecting a non-driven vehicle condition such as a deceleration condition, a braking condition, a tip-out condition, a rate of change of engine speed being less than a predetermined threshold, a braking signal from an adaptive cruise control system (that senses a distance to a vehicle directly in front of the present vehicle and automatically actuates vehicle brakes to maintain a threshold separation from the preceding vehicle), or another type of condition signaling a non-driven vehicle condition. As an example, the non-driven vehicle condition may be when the depression amount of the driver's braking pedal is greater than a threshold value. As another example, the non-driven vehicle condition may be when the driver's braking effort (e.g., a force on the braking pedal) is greater than a threshold value. As yet another example, the non-driven vehicle condition may be when the brake pressure is greater than a threshold value. As even another example, the non-driven vehicle condition may be when the actuation degree of the vehicle brakes (e.g., electrically actuated brakes) is greater than a threshold value.

If it the vehicle does not have a non-driven vehicle condition (i.e., the vehicle is being driven), then method 200 ends. However, if the vehicle does have a non-driven vehicle condition, then method 200 proceeds to 204 and includes adjusting opening of the grill shutters. Adjusting opening of the grill shutters may include opening the grill shutters, closing the grill shutters, partially opening the grill shutters, partially closing the grill shutters, increasing opening of the shutters, decreasing opening of the shutters, adjusting opening/closing timing of the shutters, etc. It can be appreciated that adjusting opening of grill shutters 114 may include adjusting a degree of opening of grill shutters 114 between various "open" degrees. As an example, grill shutters 114 may be adjusted to a percentage of being fully open, where 100% open corresponds to the shutters being fully opened. In such an example, adjusting opening of grill shutters 114 may include, for example, opening grill shutters to 40% open. Likewise, adjusting opening of grill shutters 114 may include, for example, partially closing grill shutters 114 from 40% open to 20% open.

As such, method 200 may include receiving intake air through the grill shutters, such that adjusting opening of the grill shutters includes adjusting an amount of intake air directed to an engine compartment. For example, opening the grill shutters to a greater degree allows more intake air to be received through the grill from outside of the vehicle and passed to the engine compartment for cooling purposes, for a given vehicle speed. Likewise, closing the grill shutters to a lesser degree of open allows less intake air to be received through the grill from outside of the vehicle and passed to the engine compartment for cooling purposes, for a given vehicle speed.

Further, in some embodiments, adjusting opening of the grill shutters includes adjusting opening of the grill shutters by an amount based on a degree of the non-driven vehicle condition (e.g., a degree of deceleration). For example, upon determining at 202 that the vehicle has a non-driven vehicle condition, method 200 may further include determining a degree of the non-driven vehicle condition. As such, adjusting opening of the grill shutters at 204 may be based on the determined degree of the non-driven vehicle condition. For example, a larger deceleration may correspond to increasing opening of the grill shutters to a greater degree of open. As another example, a smaller deceleration may correspond to increasing opening of the grill shutters to a lesser degree of open.

As a nonlimiting example, method 200 may include determining that the brakes are being engaged, and in response, opening the grill shutters allowing the additional air to cool engine compartment components. As another example, method 200 may include determining that the vehicle is decelerating due to tip-out, and in response, opening the grill shutters allowing the additional air to cool engine compartment components.

Figure 3:
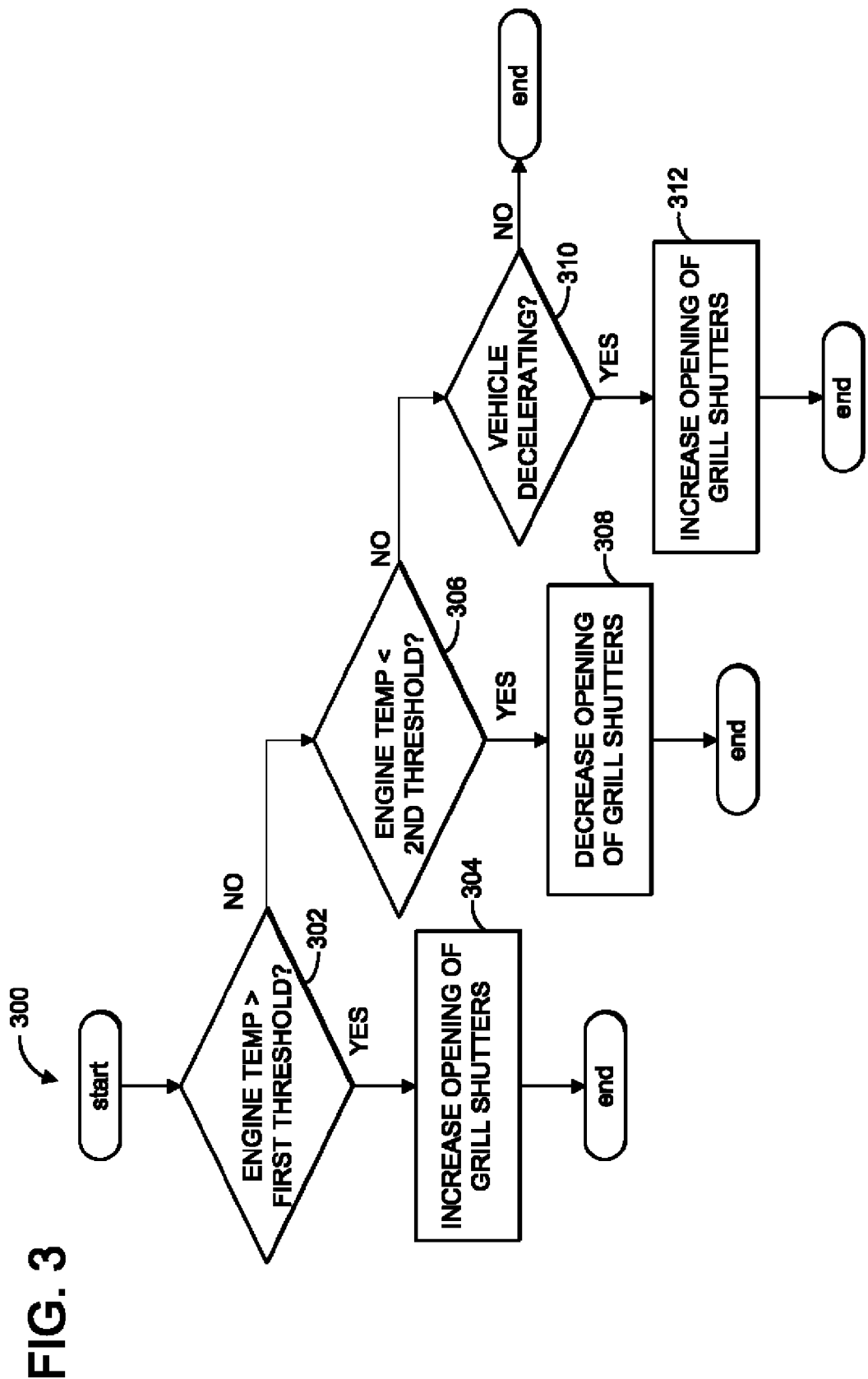
FIG. 3 shows a flow diagram of another example method of adjusting a grill shutter system in accordance with an embodiment of the present disclosure.

FIG. 3 shows an example method 300 of adjusting a grill shutter system based on engine temperature and vehicle deceleration in coordination. At 302, method 300 includes determining if the engine temperature is greater than a first threshold. This determination may include measuring a temperature of the engine coolant and comparing the measured temperature to a threshold temperature. For example, the first threshold temperature may correspond to a temperature threshold where additional engine cooling is needed. It can be appreciated that other suitable techniques may be used to determine the engine temperature, and are included within the scope of method 300.

If it is determined that the engine temperature is greater than the first threshold, then at 304, method 300 includes increasing opening of the grill shutters. As described above, this may include fully opening the grill shutters or partially opening the grill shutters. This may include enabling more intake air to flow through the shutters to assist the vehicle's cooling system in cooling the engine.

Alternatively, if it is determined that the engine temperature is not greater than the first threshold, method 300 proceeds to 306 to determine if the engine temperature is below a second threshold. If so, method 300 proceeds to 308 to decrease opening of the grill shutters. For example, the second threshold temperature may correspond to a temperature threshold where engine cooling needs are reduced, in which case the grill shutters can be closed or partially closed to reduce the intake air flowing through the shutters to the engine compartment.

If it is determined that the engine temperature is not below a second threshold, method 300 proceeds to 310 to determine if the vehicle is decelerating, such as described above herein. For example, in some embodiments, it may be determined that deceleration is present. However, in some embodiments, it may be determined that deceleration is not only present, but that the deceleration exceeds a threshold deceleration value. Further, in some embodiments, deceleration may be indicated by braking, or by tip-out, etc.

If the vehicle is decelerating, then method 300 proceeds to 312, and method 300 includes increasing opening of the grill shutters. By increasing opening of the grill shutters, more intake air can be received through the grill from outside of the vehicle and passed to the engine compartment for cooling purposes. However, if the vehicle is not decelerating, then method 300 ends.

As such, the depicted example includes increasing opening of the grill shutters when a coolant temperature is below a threshold value and vehicle deceleration is present. Even though additional cooling may not be needed based on the engine coolant temperature, the engine can still be pre-cooled advantageously during deceleration. As described above, such pre-cooling allows powertrain and/or other vehicle components to be cooled to lower temperatures than they would typically be cooled otherwise, thus allowing a subsequent opening of the grill shutters to be delayed since it will take longer for the engine temperature to reach the first threshold, or allowing lesser opening of the grill shutters during vehicle acceleration or other non-braking conditions.

It can be appreciated that method 300 is nonlimiting, in that method 300 may adjust opening of one or more of the grill shutters located at the front end opening of the vehicle based on engine temperature and vehicle deceleration using a different approach. For example, in some embodiments, method 300 may initially determine if the vehicle is decelerating, and if not, proceed to comparing the engine temperature to the threshold values. Further, although method 300 determines if cooling is desired based on an engine temperature, it can be appreciated that other temperatures may be additionally or alternatively used. For example, a measured temperature such as intake manifold temperature or a modeled temperature (exhaust, engine oil, etc) may be used to determine if cooling is desired.

Figure 4:
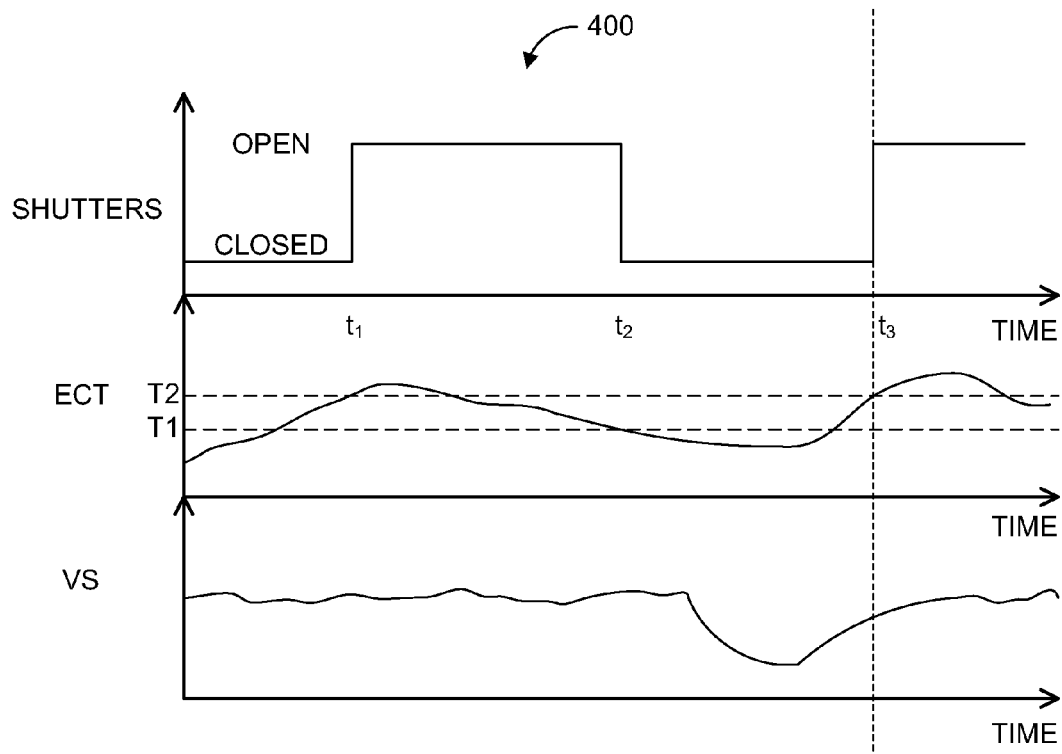
FIG. 4 shows an example comparison of engine cooling due to shutter operation, in accordance with an embodiment of the present disclosure.
Figure 4:
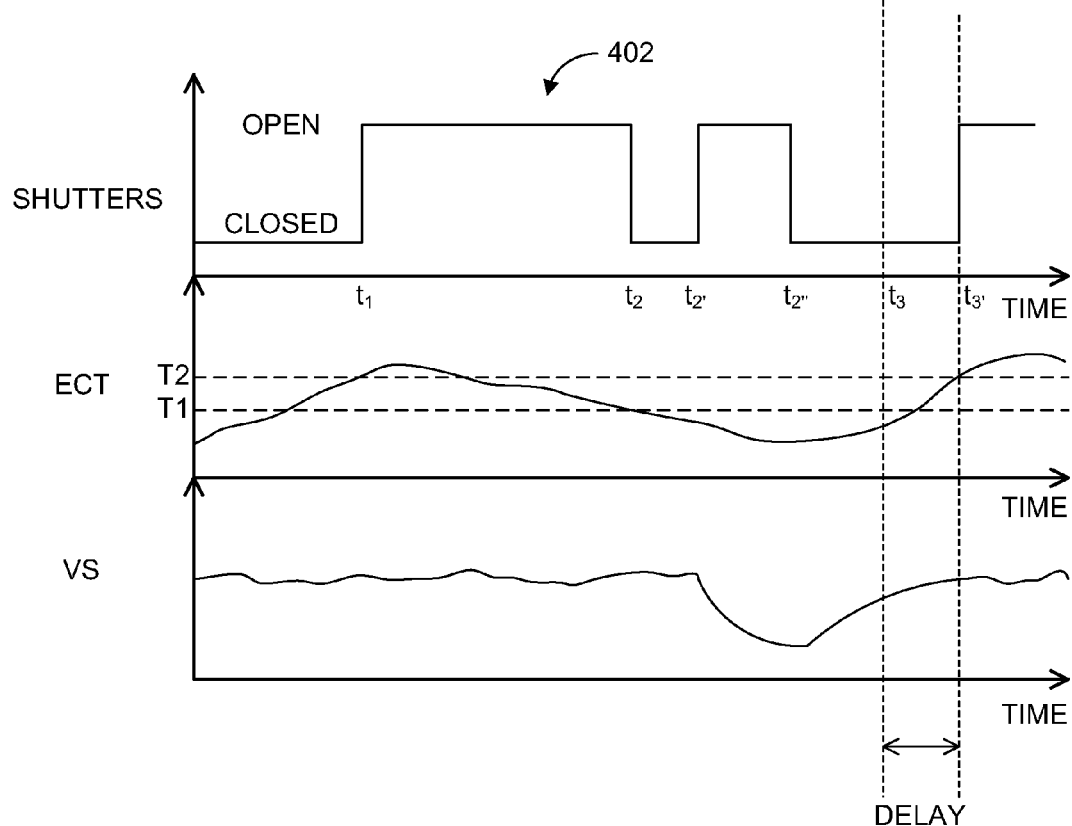

FIG. 4 shows an example comparison of engine cooling due to shutter operation. The example shows a comparison of chart 400 and chart 402 for a vehicle speed (VS) scenario as a function of time. Chart 400 illustrates a first example operation of grill shutters independent of vehicle deceleration, wherein opening and closing of the grill shutters is based on engine temperature, represented in this figure as an engine coolant temperature (ECT). Alternatively, chart 402 illustrates a second example of an adjustable grill shutter system wherein operating of grill shutters is based on engine coolant temperature and vehicle deceleration.

With regard to chart 400, at time $t_1$, the engine coolant temperature exceeds a threshold value T2, and the grill shutters are opened. The shutters remain open until at time $t_2$, the engine coolant temperature falls below another threshold value T1. After time $t_2$, the vehicle speed indicates a vehicle deceleration or vehicle braking condition during which the engine coolant temperature drops slightly, followed by a subsequent acceleration during which the engine coolant temperature increases. At time $t_3$, the engine coolant temperature exceeds the threshold value T2, and the shutters are opened.

With regard to chart 402, chart 402 also shows opening the grill shutters when the engine coolant temperature exceeds the threshold value T2 and shows keeping the shutters open until the engine coolant temperature falls below threshold value T1 at time $t_2$. However, upon detecting the subsequent deceleration or braking, chart 402 shows opening the shutters during the deceleration or braking, from $t_{2'}$ to time $t_{2''}$. As such, the engine is allowed to cool more than in the example illustrated in chart 400. As such, the engine corresponding to chart 402 is at a cooler temperature when the vehicle begins the subsequent acceleration, and thus it takes longer for the engine coolant temperature to exceed the threshold value T2. Accordingly, in the example depicted in chart 402, the shutters are opened at time $t_{3'}$ instead of time $t_3$ as shown in chart 400. Thus, by adjusting opening of the shutters during deceleration, opening of the shutters at a subsequent acceleration can be delayed. In the depicted example, such a delay corresponds to the difference in time between time $t_3$ and time $t_{3'}$.

Figure 5:
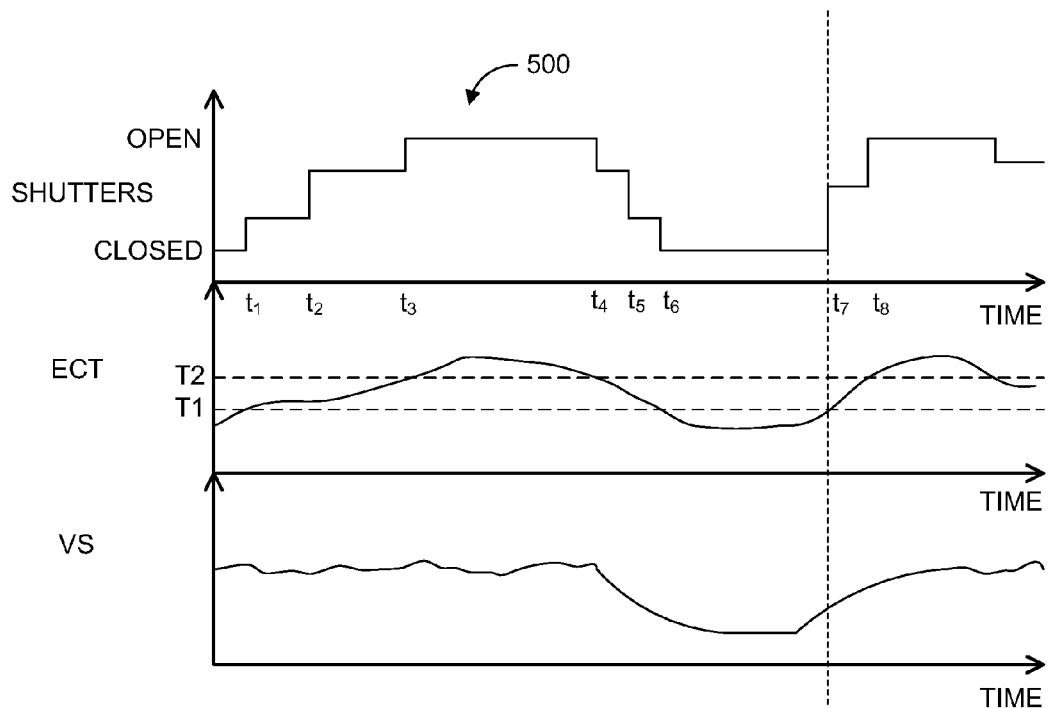
FIG. 5 shows another example comparison of engine cooling due to shutter operation, in accordance with an embodiment of the present disclosure.
Figure 5:
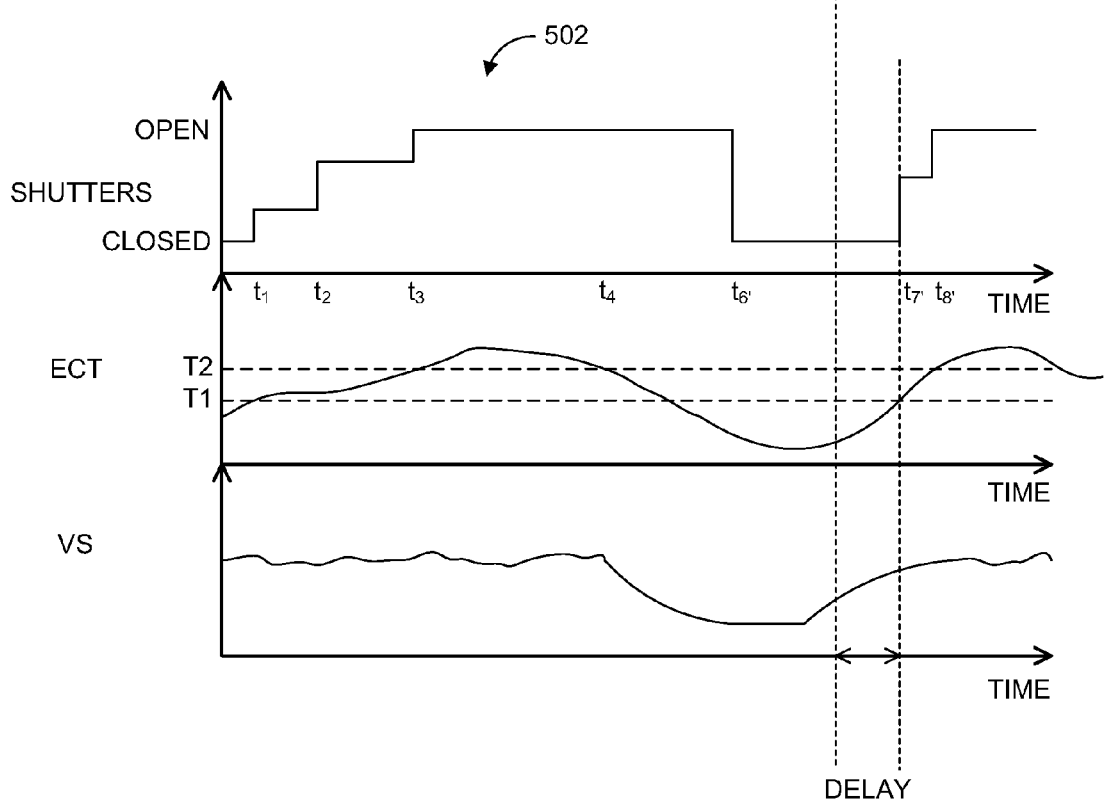

FIG. 5 shows another example comparison of engine cooling due to shutter operation. The example shows a comparison of chart 500 and chart 502 for a vehicle speed (VS) scenario as a function of time. Chart 500 illustrates a first operation of grill shutters, wherein opening and closing of the grill shutters is based on engine temperature and independent of vehicle deceleration. In this example, grill shutters may be opened to any degree of opening between fully open and fully closed. Chart 502 illustrates an embodiment of an adjustable grill shutter system wherein operating of grill shutters is based on engine coolant temperature and vehicle deceleration. Such a grill system is also capable of partially opening and closing the grill shutters.

With regard to chart 500, at time $t_1$, the engine coolant temperature exceeds a first threshold value T1, and the grill shutters are partially opened. At time $t_2$, the engine coolant temperature increases, and the opening of the grill shutters is also increased. At time $t_3$, the engine coolant temperature exceeds a second threshold value T2, and the opening of the grill shutters is further increased to a fully-open state. The shutters remain open until at time $t_4$, when the vehicle speed indicates a vehicle deceleration during which the engine coolant temperature drops slightly, and the engine coolant temperature falls below threshold value T2. During the deceleration, the engine coolant temperature continues to drop, and the opening of the grill shutters is decreased accordingly at times $t_5$ and $t_6$. After time $t_6$, a subsequent acceleration begins, during which the engine coolant temperature increases, and the grill shutters are partially opened at time $t_7$. At time $t_8$, the engine coolant temperature exceeds the threshold value T2 and the shutters are fully opened.

With regard to chart 502, chart 502 also shows continuing to increase opening of the grill shutters at times $t_1$, $t_2$ and $t_3$ in response to increasing engine coolant temperature. However, upon detecting the vehicle deceleration at time $t_4$, the shutters are held open from $t_4$ to time $t_{6'}$, even though the engine coolant temperature continues to drop. As such, the engine is allowed to cool more than in the example illustrated in chart 500. As such, the engine corresponding to chart 502 is at a cooler temperature when the vehicle begins the subsequent acceleration, and thus it takes longer for the engine coolant temperature to reach the threshold values T1. As such, the shutters are opened at time $t_{7'}$ instead of time $t_7$ as shown in chart 500. Thus, by opening the shutters during deceleration, opening of the shutters at a subsequent acceleration can be delayed. In the depicted example, such a delay corresponds to the difference in time between time $t_7$ and time $t_{7'}$.

Figure 6:
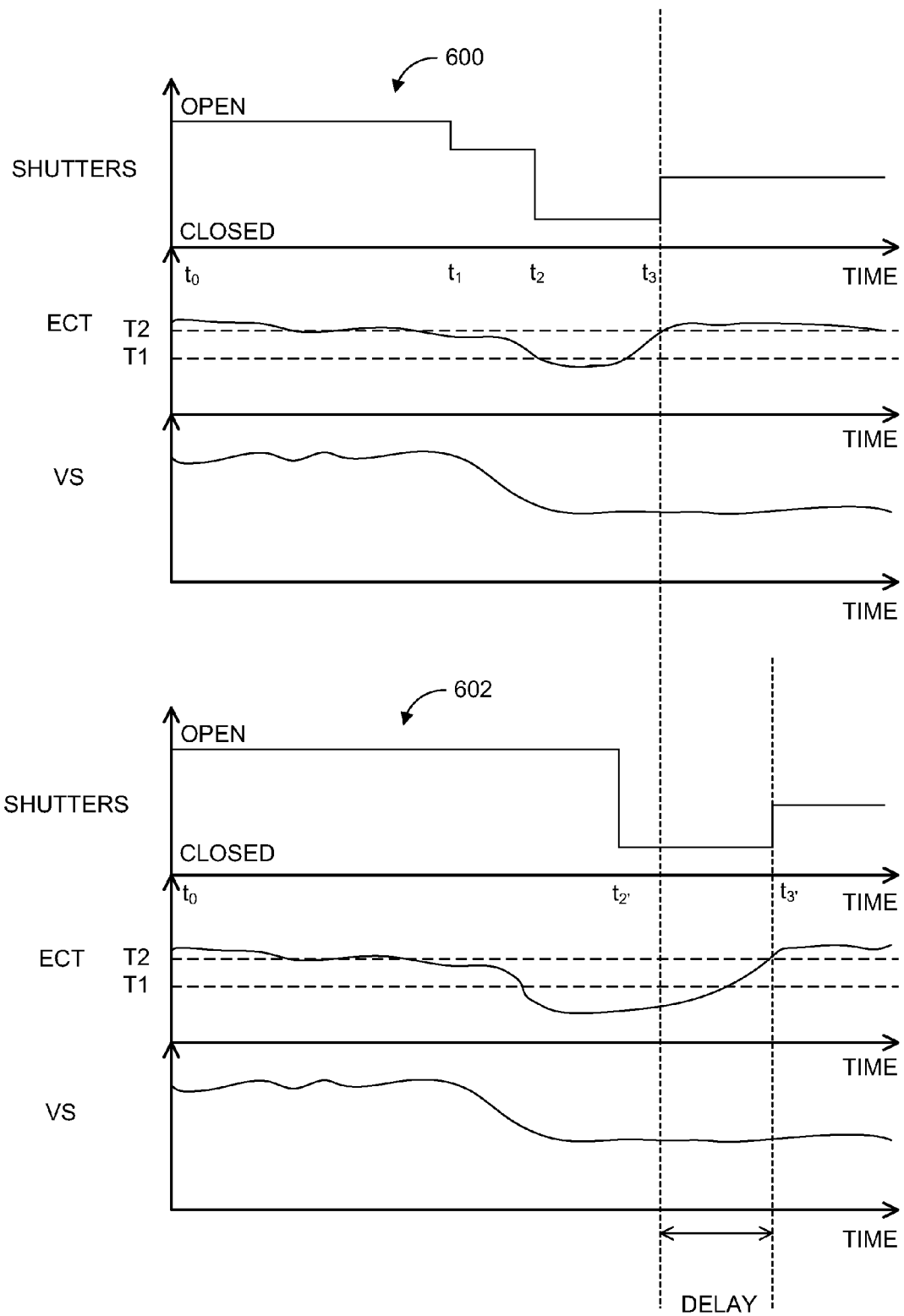
FIG. 6 shows yet another example comparison of engine cooling due to shutter operation, in accordance with an embodiment of the present disclosure.

FIG. 6 shows yet another example comparison of engine cooling due to shutter operation. The example shows a comparison of chart 600 and chart 602 for a vehicle speed (VS) scenario as a function of time. Chart 600 illustrates a traditional operation of grill shutters, wherein adjustment (opening, partially opening, closing, partially closing, etc.) of the grill shutters is based on engine temperature, represented in this figure as an engine coolant temperature (ECT). Alternatively, chart 602 illustrates an embodiment of an adjustable grill shutter system wherein operating of grill shutters is based on engine coolant temperature and vehicle deceleration.

With regard to chart 600, at a start time $t_0$, the engine coolant temperature exceeds a threshold value T2, and the grill shutters are open. The shutters remain open until at time $t_1$, when the vehicle speed indicates a vehicle deceleration due to tip-out, during which the engine coolant temperature drops slightly and the grill shutters are partially closed (i.e., opened to a smaller degree of opening than the shutters were at previously). During tip-out, the engine coolant temperature continues to drop, and at time $t_2$, the shutters are fully closed. After time $t_2$, the vehicle speed indicates a subsequent cruise operation, during which the engine coolant temperature increases. At time $t_3$, the engine coolant temperature begins to exceed the threshold value, and the shutters are partially opened.

With regard to chart 602, chart 602 also shows the grill shutters open at a start time $t_0$ when the engine coolant temperature exceeds a threshold value T2. However, upon detecting the vehicle deceleration due to tip-out, chart 602 shows opening the shutters during the deceleration. As such, the shutters remain open until time $t_2$. As such, the engine is allowed to cool more than in the example illustrated in chart 600. Accordingly, the engine corresponding to chart 602 is at a cooler temperature when the vehicle begins the cruise operation, and thus it takes longer for the engine coolant temperature to exceed the threshold value T2. In the example depicted in chart 602, the shutters are partially opened at time $t_{3'}$ instead of time $t_3$ as shown in chart 600. Thus, by opening the shutters during deceleration, opening of the shutters at a subsequent cruise operation can be delayed. In the depicted example, such a delay corresponds to the difference in time between time $t_3$ and time $t_{3'}$.

Note that the example control and estimation routines included herein can be used with various engine and/or vehicle system configurations. The specific routines described herein may represent one or more of any number of processing strategies such as event-driven, interrupt-driven, multi-tasking, multi-threading, and the like. As such, various acts, operations, or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated acts or functions may be repeatedly performed depending on the particular strategy being used. Further, the described acts may graphically represent code to be programmed into the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and nonobvious combinations and subcombinations of the various systems and configurations, and other features, functions, and/or properties disclosed herein.

The following claims particularly point out certain combinations and subcombinations regarded as novel and nonobvious. These claims may refer to "an" element or "a first" element or the equivalent thereof. Such claims should be understood to include incorporation of one or more such elements, neither requiring nor excluding two or more such elements. Other combinations and subcombinations of the disclosed features, functions, elements, and/or properties may be claimed through amendment of the present claims or through presentation of new claims in this or a related application.

Such claims, whether broader, narrower, equal, or different in scope to the original claims, also are regarded as included within the subject matter of the present disclosure.

The invention claimed is:

1. A method of adjusting a grill shutter system for a vehicle, comprising:
during a driven vehicle condition, closing grill shutters located at a vehicle front end opening to reduce engine cooling when engine temperature is below a threshold temperature; and
during a non-driven vehicle condition, opening the grill shutters to pre-cool vehicle components when engine temperature is below the threshold temperature, the non-driven vehicle condition being braking or deceleration.

2. The method of claim 1, further comprising receiving intake air through the one or more grill shutters, and wherein opening and closing the grill shutters includes adjusting an amount of intake air directed to an engine compartment.

3. The method of claim 1, wherein the non-driven vehicle condition includes a tip-out condition.

4. The method of claim 1, further comprising detecting a subsequent acceleration and adjusting opening of the grill shutters based on engine temperature.

5. The method of claim 4, wherein adjusting opening of the grill shutters includes decreasing opening of the grill shutters.

6. A method of adjusting a grill shutter system for a vehicle, comprising:
adjusting opening of one or more grill shutters located at a front end opening of the vehicle based on engine temperature and vehicle deceleration, including:
during a vehicle deceleration condition with the vehicle moving, opening the one or more grill shutters located at the vehicle front end opening to pre-cool vehicle components when engine temperature is below a threshold temperature; and
during a driven vehicle acceleration condition with the vehicle moving, closing the one or more grill shutters to reduce engine cooling when engine temperature is below the threshold temperature.

7. The method of claim 6, wherein engine temperature is a coolant temperature.

8. The method of claim 6, wherein vehicle deceleration includes braking with vehicle brakes being engaged.

9. The method of claim 6, wherein vehicle deceleration occurs responsive to a driver tip-out.

10. A vehicle grill shutter system configured to direct intake air received through grill shutters to an engine compartment of a vehicle for cooling components therewithin, the vehicle grill shutter system being communicably connected to a controller having instructions stored thereon and executable to:
determine, via the controller, a vehicle braking condition;
during a driven vehicle non-braking condition, closing grill shutters located at a vehicle front end opening to reduce engine cooling when engine temperature is below a threshold temperature;
during the vehicle braking condition, opening the grill shutters to pre-cool vehicle components when engine temperature is below the threshold temperature.

11. The vehicle grill shutter system of claim 10, wherein the instructions are further executable to determine, via the controller, a coolant temperature, and to adjust opening of the grill shutters based on the vehicle braking condition and the coolant temperature.

* * * * *